United States Patent [19]
Campbell

[11] 3,821,479
[45] June 28, 1974

[54] NONINTERFERING ELECTRICAL SIGNALING

[75] Inventor: David W. Campbell, Brooklyn, N.Y.

[73] Assignee: American District Telegraph Company, Jersey City, N.J.

[22] Filed: Apr. 16, 1973

[21] Appl. No.: 351,660

[52] U.S. Cl. .......... 179/15 BF
[51] Int. Cl. .......... H04j 1/16
[58] Field of Search .......... 179/15 BF, 15 AL

[56] References Cited

UNITED STATES PATENTS

| | | | |
|---|---|---|---|
| 3,458,661 | 7/1969 | Forde | 179/15 BF |
| 3,493,683 | 2/1970 | Schlichte | 179/15 BF |
| 3,692,939 | 9/1972 | Knight | 179/15 BF |

*Primary Examiner*—Ralph D. Blakeslee
*Attorney, Agent, or Firm*—Gary A. Walpert

[57] ABSTRACT

An electrical protection circuit having at least one line circuit, the line circuit consisting of a plurality of data transmitters and data receivers, is described. The data transmitters are connected in parallel across a transmission path and operate in a frequency multiplexing mode. The data receivers at a central supervisory station are connected in parallel and a deviation from normal at any of the data transmitters is recorded and stored in input circuits at the central supervisory station. A return to normal is similarly recorded and stored. The input circuits are sequentially scanned and messages are printed corresponding to the state of the input circuit. The system includes fault detecting and alarm circuitry which conditions the line circuit when a break occurs. A programmer dircuit connected to the printer provides a unique message cofresponing to each input circuit. Time discriminator units at the monitor station and the central supervisory station are provided to enable a single tone transmitter to indicate the condition of a momentary actuating device and an extended time actuating device.

14 Claims, 5 Drawing Figures

PATENTED JUN 28 1974 3,821,479

NONINTERFERING ELECTRICAL SIGNALING

BACKGROUND OF THE INVENTION

The invention relates to electrical signaling systems and, in particular, noninterfering electrical signaling systems used in protection and alarm systems having a central supervisory station and several remote stations.

Electrical signaling systems can be used to remotely monitor the condition of fire alarm boxes, waterflow alarms, burglar alarms, watchman's reporting stations, and industrial process supervisory control systems. These systems can also provide automatic monitoring and control of building environmental conditions. When used as monitoring and control units, the apparatus requires a high degree of reliability.

A variety of techniques have been used in general purpose data transmission electrical signaling systems. These techniques consist of either utilizing a separate transmission path from each monitoring station to a central supervisory station or connecting each of the monitor stations to a frequency and/or time division multiplexing equipment for transmission of their signals over a common data transmission path to the central supervisory station. Monitor stations may include an actuating device to control multiplex transmitting equipment or a transponder which can be interrogated by the central supervisory station. Signals from the transponder indicate the status of an actuating device connected to it. The data signals received at the central station are examined to determine if any deviation from normal exists.

The data transmission path over which the signals are transmitted are often wire conductors. A fault in one or more conductors, such as a break, a short between conductors, or an earth ground of one of the conductors could adversely affect the reliability and operability of the data transmission apparatus.

It is a primary object of the invention to provide a high reliability data transmission system. Another object of the invention is to provide a high reliability data transmission system having input, scanner, and programming circuitry for efficiently recording and outputing information about a multiplicity of monitor stations.

Other objects of the invention are to maintain the integrity of a multiplex data transmission system in spite of a break in the transmission path and to provide a monitor station wherein different time length signals can be transmitted to indicate the status of a plurality of actuating devices.

BRIEF DESCRIPTION OF THE INVENTION

The invention relates to an electrical signaling system which comprises a plurality of monitor stations for transmitting signals in response to the status of a selected condition. The signals are transmitted over a transmission path which interconnects the monitor stations and a supervisory central station. The supervisory central station includes receiving devices for receiving the signals transmitted by the monitor stations. The receiving devices have an output which indicates the status of the selected device.

In one aspect, the invention features input circuits associated with each receiving device. The input has a clocked flipflop connected to the output of the receiving device. The status of the selected condition may be stored by the flipflop. The input circuit also includes an EXCLUSIVE OR gate having inputs from both the flipflop and the receiving device. The output of the EXCLUSIVE OR gate changes in the same fixed direction whenever the output of the receiver circuitry changes.

The supervisory central station further includes a scanning circuit having selectors to sequentially sample the output of the EXCLUSIVE OR gates and demultiplexers to feed back a delayed version of the output of the EXCLUSIVE OR gate in order to clock the flipflop after the EXCLUSIVE OR output has been accepted. The delay is advantageously inserted in the feedback from the selector to the demultiplexer in order to avoid triggering on false signals.

In another aspect the invention features a current sensitive relay connected between the ends of the transmission path whereby the relay is deenergized if there is a break in the conductive path. Under these circumstances, power is supplied to both ends of each conductive path. Circuitry is provided to disconnect the relay from the power source when a break occurs and to momentarily energize the relay when the break is repaired.

Another aspect of the invention features transmitter and receiver time discriminator units whereby a single tone transmitter produces a short turn-off when a momentary switch is actuated and an extended time turn-off when an extended time switch is actuated.

Other objects, features, and advantages will appear from the following description of a preferred embodiment of the invention taken together with the attached drawings in which.

DESCRIPTION OF A PREFERRED EMBODIMENT

Figure 1:
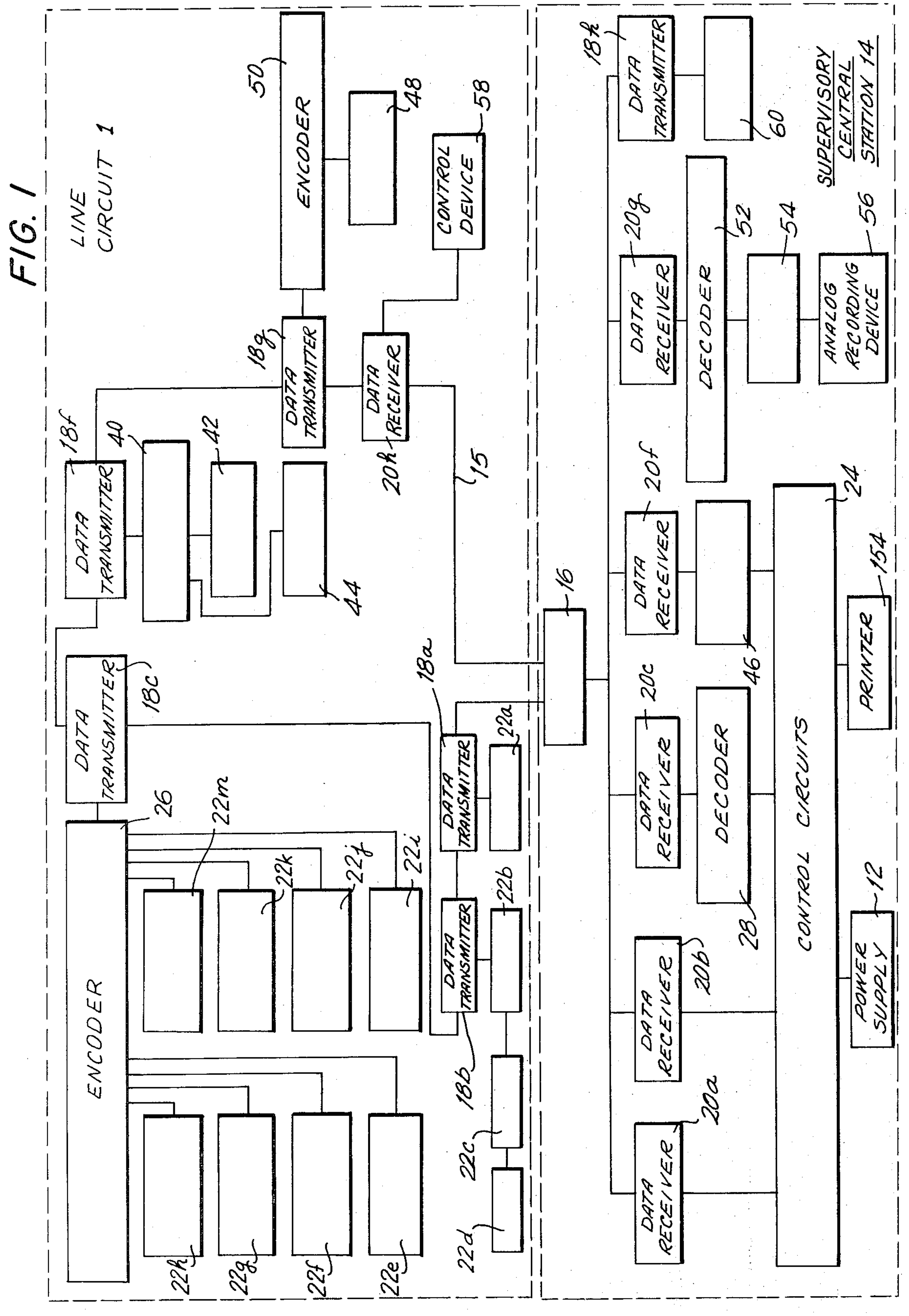
FIG. 1 is a block diagram of an electrical signaling system embodying the invention.

Referring to FIG. 1, power to operate the system is drawn from a power supply 12, for example, a 24 volt rechargeable battery, located at the supervisory central station 14 and isolated from earth ground. The battery is preferably arranged to be trickle charged from locally available 110 volts A.C. power line (not shown). The power supply 12 may also be any other suitable power source which can be isolated from earth ground.

FIG. 1 shows a plurality of monitor stations connected to a transmission path 15, the monitor stations and transmission path being identified in FIG. 1 as line circuit 1. Each monitor station consists of an actuating device and its associated data transmitter or a control device and its associated data receiver. While FIG. 1 shows only one line circuit, a plurality of line circuits may be used and a line control circuit is provided at the supervisory central station 14 for each line circuit. A line control circuit 16 acts as an interface between line circuit 1 and the remainder of the supervisory central station 14.

Line control circuit 16 operates to condition the line circuit upon the occurrence of a fault. The operation of line control circuit 16 is described in detail in connection with FIG. 2.

As mentioned above, each monitor station may include actuating devices associated with data transmitters and control equipment for control devices associated with data receivers. The actuating device may be a contact or contacts and associated circuitry, if any, or a digital output corresponding, for example, to a multiplexed output of a plurality of contacts or an encoded output representing a measured signal value. The data transmitter may be either part of the actuating device or a separate unit and, in either case, operates in response to the status of the condition intended to be monitored by the actuating device. Each data transmitter and its actuating device are connected across transmission path 15, and the output signal is received by a data receiver at the supervisory central station 14. The output of the data receiver reflects the operation of the corresponding data transmitter. The output of the data receiver, either directly or through decoding or detector circuitry, describes the condition of one or more actuating devices.

A data receiver may be connected to the transmission path when it is desired to control an operation from the supervisory central station. The control equipment may be a relay which controls heating or cooling equipment. A signal transmitted by a data transmitter at the central station will be received at the remote station and the equipment will respond to the received signal.

The transmission path 15 consists of two conductors which form a loop starting at the line control circuit and returning to the line control circuit. The monitor stations are connected in parallel across the conductors and in this embodiment, the monitor stations receive their power from the transmission path.

Referring to FIG. 1, data transmitters 18*a*, 18*b*, 18*c*, 18*f*, 18*g*, 18*h* may be of any design suitable to operate over the transmission path and are, in the preferred embodiment, audio resonators combined with line powered exciters and audio amplifiers which continuously transmit a single audio frequency signal unless turned off. The transmitter may be the Line Power Transmitter sold by H. B. Engineering Company of Silver Springs, Md. The data receivers 20*a*, 20*b*, 20*c*, 20*f*, 20*g*, 20*h* can be of any type compatible with the chosen data transmitter and, in the preferred embodiment, are audio resonators combined with an audio amplifier and audio detector. The receivers may be the type manufactured by the H. B. Engineering Company.

Each data receiver and data transmitter in a line circuit operates at a different frequency and the signals are frequency multiplexed over the transmission path. Each receiver detects only the frequency of interest and rejects all other signals.

FIG. 1 shows a variety of actuating devices, control devices, and encoding devices which may be included in a single line circuit. Starting at line control circuit 16, and working clockwise along transmission path 15, there is first a noncoded supervisory switch 22*a* controlling data transmitter 18*a*. Switch 22*a* may be any device which provides a normally closed contact, and which opens when the device is actuated. When the contact is closed, associated data transmitter 18*a* is turned on; when the contact is open, associated data transmitter 18*a* turns off. The output of associated data receiver 20*a* varies according to the operation of transmitter 18*a* and the receiver output is monitored by a control circuit 24. The noncoded supervisory switch may be, for example, a gate valve position indicating switch, a water level detector switch, or a steam pressure supervisory switch.

A plurality of non-coded supervisory switches 22*b*, 22*c*, 22*d* may be connected in series to a data transmitter where it is desired, at the supervisory control central station 14, to know that one of the plurality of supervisory switches has been actuated, but where it is unnecessary to know which of the plurality of supervisory switches has been actuated. When one of the switches is actuated to the open position, data transmitter 18*b* turns off. The output of data receiver 20*b* reflects this change in condition to control circuit 24.

When it is necessary to know which of a plurality of non-coded supervisory switches at the same monitor station has been actuated, there are two alternatives. First, the plurality of supervisory switches can be arranged so that each has a separate data transmitter in a manner similar to that shown by non-coded switch 22*a* and data transmitter 18*a*. Second, and preferably, the plurality of supervisory switches may be connected to a multiplex encoder. Referring to FIG. 1, in the preferred embodiment, multiplex encoder 26 provides a stream of digital data to transmitter 18*c*. The stream of digital data represents the condition of each of non-coded supervisory switches 22*e*, 22*f*, 22*g*, 22*h*, 22*i*, 22*j*, 22*k*, and 22*m*. The multiplex encoder 26 is preferably the pulse code modulated encoder sold by H. B. Engineering Company. The encoder is a solid state scanner which scans each of its inputs at a variable clock rate and provides a data stream output of digital signals. The output signals are bilevel, and the length of time for which the output signal of multiplex encoder 26 is in a given state is indicative of the status of the switch inputs. The output of the data transmitter 18*c* connected to multiplex encoder 26 is received by data receiver 20*c* whose output is connected to multiplex decoder 28. The multiplex decoder 28 decodes the data stream, which was generated by multiplex encoder 26, transmitted by data transmitter 18c, and received by the data receiver 20c. The decoded data are stored in the decoder's buffer memory which provides an individual output, for each of the non-coded supervisory switches connected to multiplex encoder 26, to the control circuit 24. In the preferred embodiment, the multiplex decoder also checks the data stream for errors; and incorrect or erroneous signals are ignored.

In some instances, it is desirable to use a single data transmitter with two non-coded stations but not use a multiplexer. This is possible through the use of a transmitter time discriminator unit 40 which receives inputs from a momentarily operated actuating device such as watch report station 42 and an actuating device which is operated for an extended period of time such as a fire alarm box 44. When the watch report station is momentarily operated by a watchman, the time discriminator unit turns off data transmitter 18*f* for a short period of time. If, on the other hand, the fire alarm box is actuated, the data transmitter 18*f* is turned off for an extended period until the fire alarm box is reset. In the preferred embodiment the extended period device can only be manually reset at the monitor station. In order to determine at the receiver, which device was actuated, the times of actuation must not overlap. Thus, the extended time device can be three seconds or longer, and the momentarily operated actuating device can be operated for a time less than the extended time; that is, less than three seconds. The output of data transmitter 18*f* is received by data receiver 20*f*. The output of the data receiver 20f is interpreted by receiver time discriminator unit 46 to provide an output signal corresponding to each actuating device. Time discriminator circuits 40, 46 are described in greater detail in connection with FIGS. 4A and 4B.

When the signal to be monitored is an analog or continuous signal, as opposed to a two state on-off or switchtype signal, an analog-to-digital converter 48 may be used to convert the analog signal to a digital number. The digital number, represented on the output signal lines of converter 48, is serially encoded by multiplex encoder 50 for transmission by data transmitter 18*g* over the transmission path. The output of data transmitter 18*g* operates data receiver 20g which is connected to multiplex decoder 52. Multiplex decoder 52 converts the serial input to a digital number and the digital number is converted by digital-to-analog converter 54 to an analog signal level. The output of digital-to-analog converter 54 is connected to an analog recording device 56 which may be, for example, a chart recorder.

A control device 58, for example a relay which is used to shut down air conditioning fans, is operated from data receiver 20*h* when data transmitter 18*h* is turned on. Data transmitter 18*h* may be turned on from any actuating device, for example, a manually operated switch 60, or the output of any one of the data receivers located at the supervisory control station.

The monitoring stations, that is the data transmitters, data receivers, and, respectively, their associated actuating devices, interface devices, and control devices can be positioned in any sequence along the transmission path. In addition, any data transmitted from a data transmitter located at any point on the transmission path can be received by an associated data receiver located at any other location in the transmission path. This results because the data transmitters and data receivers in the line circuit are connected in parallel.

Figure 2:
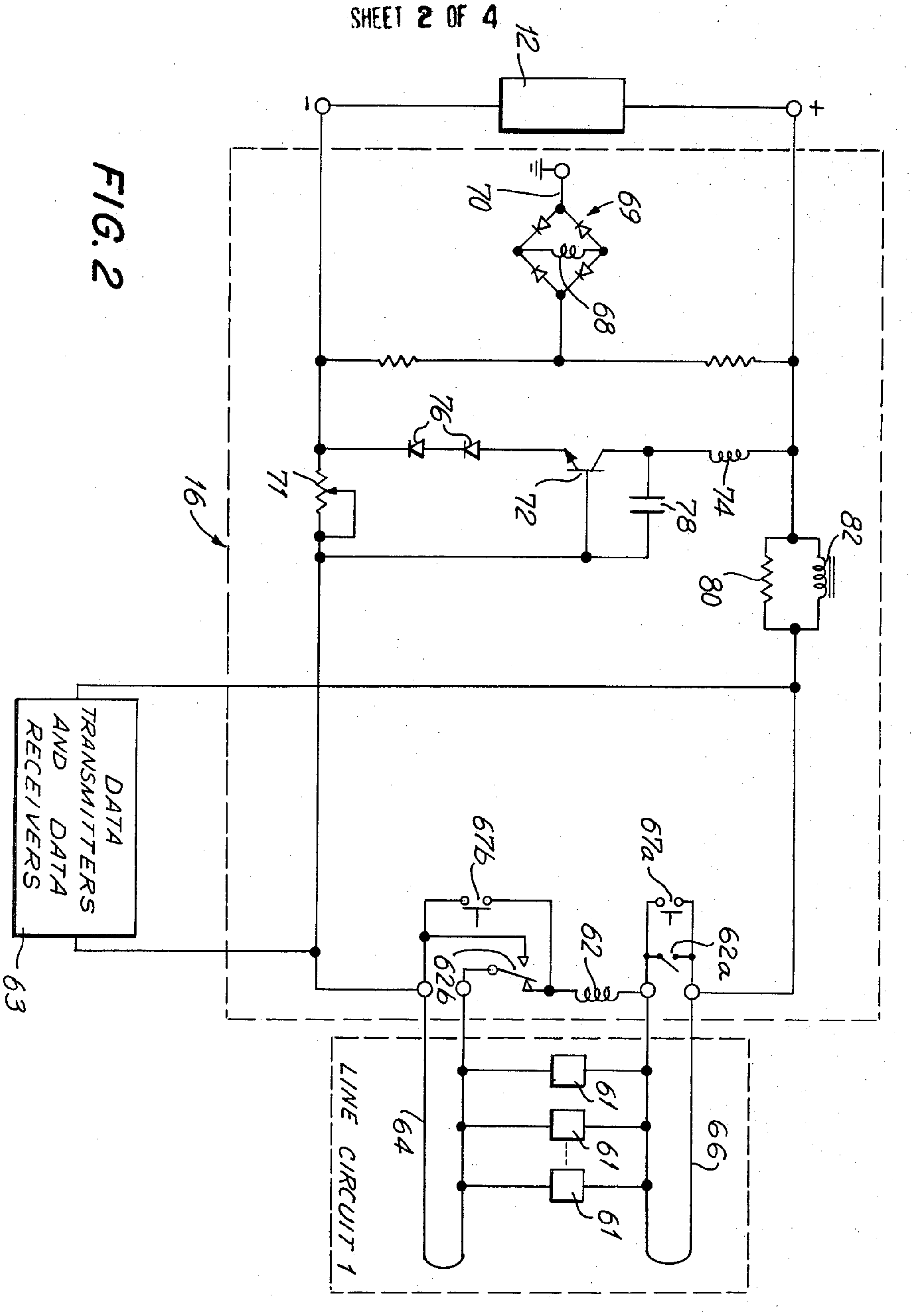
FIG. 2 is a schematic diagram of a line control circuit of the system shown in FIG. 1.

FIG. 2 shows a preferred circuit arrangement for line control circuit 16. The line control circuit is so constructed that if a fault occurs in the transmission path, operation and integrity of the system is maintained while lamps and sounding devices (not shown) are provided to alert an operator of the nature of the line circuit fault. The fault may be a break in the transmission path, an earth grounding of one of the conductors forming the transmission path, or a short between the conductors of the transmission path.

FIG. 2 also shows the manner in which data receivers and data transmitters and their associated circuitry, all designated by reference number 61, are arranged in parallel across the transmission path. The figure also shows that the data transmitters and receivers at the central supervisory station, designated by reference number 63, are connected in parallel at line control circuit 16 across the transmission path.

In operation, if a break occurs in the transmission path, relay coil 62, which in normal operation is energized, deenergizes and releases. The transmission path consists of conductive loops 64, 66. Relay contacts 62*a* and 62*b*, associated with relay coil 62, are shown in FIG. 2 with coil 62 energized. Thus, when relay coil 62 is deenergized, the relay contact 62*a* closes and relay contact 62*b* changes position so that power is applied to both ends of each conductive loop 64, 66 of the transmission path, thereby ensuring that power is provided to all of the data transmitters and data receivers. At the same time, an additional contact associated with relay coil 62 will light a lamp or energize an alarm to indicate at the central station the nature of the fault. A push button switch having contacts 67*a* and 67*b* is provided so that after the break has been corrected, relay coil 62 can be energized. This resets the circuit to its normal operating condition.

As mentioned above, the power supply 12 is isolated from earth ground in the preferred embodiment. If, therefore, there is an earth ground fault in the transmission path, one or the other side of the D.C. power supply will be near earth ground and relay coil 68, normally deenergized, will operate and energize. Relay coil 68 is connected in a diode circuit 69, one side 70 of the diode circuit being connected to earth ground. A relay contact (not shown) associated with relay coil 68 may operate lamp and audible sound alarms to indicate the nature of the transmission path fault.

The line control circuit of FIG. 2 will also detect a short between the two conductive loops. In operation, the current which flows through an adjustable resistor 71 produces a small voltage drop across that resistor. The voltage drop is normal operation is insufficient to cause a transistor 72 to conduct current and, therefore, a relay coil 74 connected to the transistor is not energized. If the current through resistor 71 increases, the voltage drop across resistor 71 increases and depending upon the type and number of reference diodes 76, transistor 72 will at a predetermined current conduct because its base-emitter junction becomes forward biased. Relay coil 74 will then be energized. Additional contacts associated with relay coil 74 (not shown) are provided to operate lamps and audible alarms to indicate the nature of the line fault. Capacitor 78 is provided to inhibit energization of relay coil 74 where the increased current is of momentary duration. Resistor 80 and coil 82 act to block A.C. signals.

Figure 3:
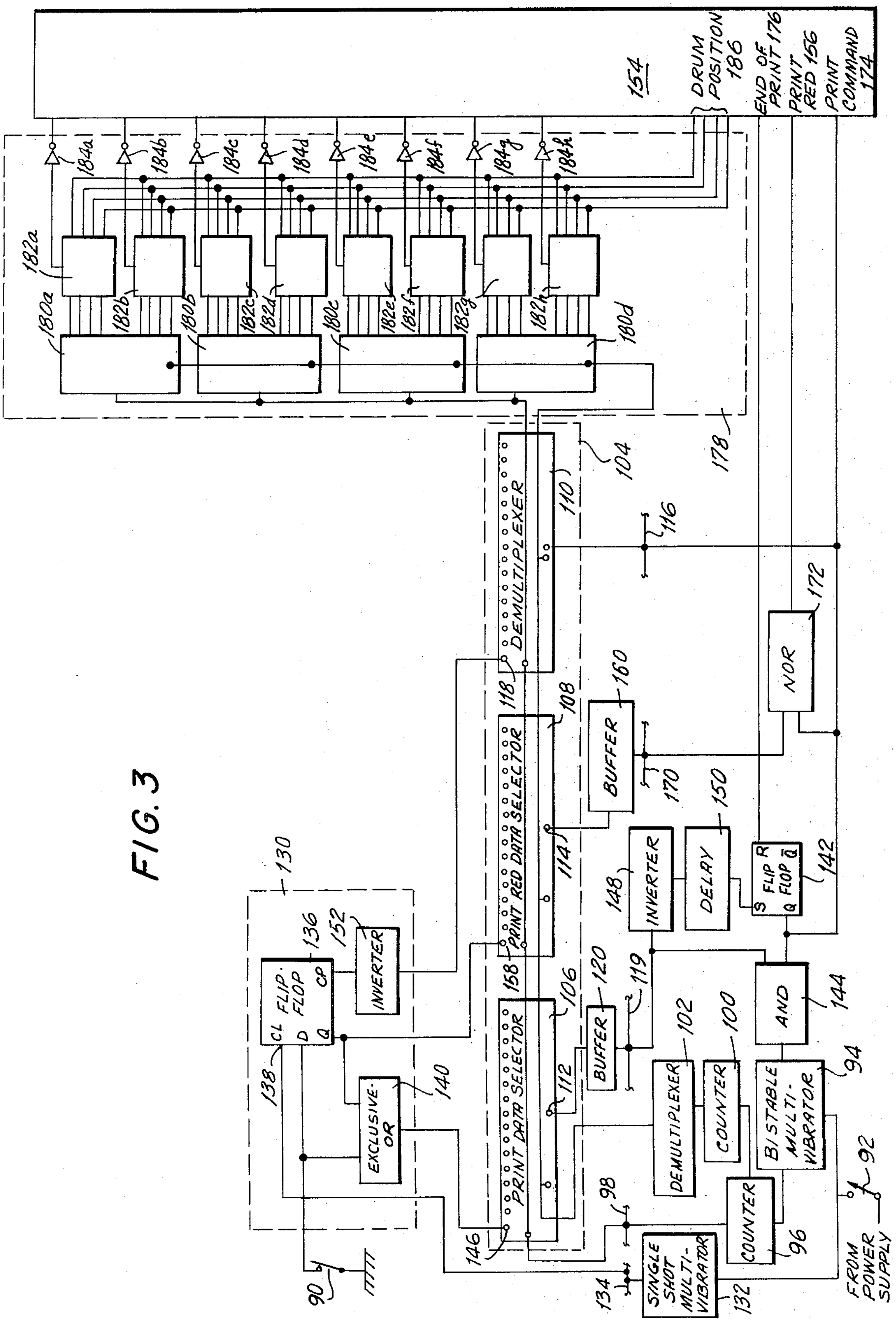
FIG. 3 is a block diagram of the input, scanner, and control circuits of the system shown in FIG. 1.

FIG. 3 shows a preferred embodiment of control circuit 24 of the system shown in FIG. 1. The output of each data receiver, multiplex decoder, or other device, for example, relay contacts, can be represented by an open or closed switch, such as input switch 90 connected to logic "0". In normal operation, input switch 90 is in the closed position indicating the normal operating condition at the monitor station. When the condition being monitored deviates from normal, switch 90 would assume an open position. The switch would then assume the closed position when the condition being monitored restores itself or is restored to normal. In a large system, there are a plurality of inputs having an output function equivalent to that of switch 90; however, for the purposes of illustration, only one input, switch 90, is shown and described.

When power is applied to the control circuitry by closing a power-on switch 92, a bistable multivibrator 94 is enabled. The output of multivibrator 94 is applied to increment a counter 96. Counter 96 is a four bit binary counter, the four bit output being applied to count bus 98. The high order bit of counter 96 is applied to increment a counter 100, also a four bit binary counter. The four bit output of counter 100 is applied to a 4-line to 16-line demultiplexer 102. For each four bit count of counter 100 (of which there are sixteen), demultiplexer 102 enables one and only one of its sixteen output lines.

The output of demultiplexer 102 enables one of a maximum number of 16 scanner circuits 104. FIG. 3 shows one of the possible 16 scanner circuits. Each scanner circuit 104 consists of a print data selector 106, print red data selector 108, and demultiplexer 110. Print data selector 106 and print red data selector 108 perform the same function, and may be, for example, Texas Instruments Corp. type SN 74150. These units are enabled by the signal from demultiplexer 102 and once enabled, the signal on the input terminals designated by the count on bus 98 is selected and placed on outputs 112 and 114, respectively. Demultiplexer 110 performs the reverse function and may be, for example, Texas Instruments type SN 74154. After being enabled by demultiplexer 102, demultiplexer 110 makes the input from signal acknowledge bus 116 available to the output terminal, for example output terminal 118, designated by the signal on count bus 98. Thus, each component of all scanner circuits 104 is connected to the count bus 98.

As noted, the scanner circuits are sequentially selected by demultiplexer 102. The varying binary count on the count bus 98 then sequentially connects the inputs of the print data selector for the enabled scanner circuit, one input at a time, to print bus 119 through buffer gate 120.

Under normal conditions, the input to print data selector 106 from an input circuit 130 will be a logic "0". When the power-on switch 92 is closed, applying power to the system, a single shot multivibrator 132 is enabled thereby applying a momentary logic "0" to a clear bus 134. A flipflop 136 of input circuit 130, preferably a type D flipflop, is connected to the clear bus 134 at its "clear input" 138. The leading edge of the single shot multivibrator 132 output signal operates to clear flipflop 136 resulting in a logic "0" on the Q output. Since the output of switch 90 is normally at logic "0", the output of EXCLUSIVE OR gate 140 is also logic "0". Thus, under normal conditions, the input to inverting buffer gate 120 is at logic "0", and its output will be logic "1".

The Q output for flipflop 142, in the preferred embodiment of the R-S type, is at logic "1", so that both inputs to AND gate 144 are at logic "1". AND gate 144 thereby has a logic "1" output which enables bistable multivibrator 94 as was previously assumed.

When one of the conditions being monitored changes to a logic "1", corresponding to opening switch 90, the output of EXCLUSIVE OR gate 140 changes to logic "1". When the input to the print data selector 106 corresponding to a logic "1" is selected, the output of the print data selector will change to a logic "1", and the output of inverting buffer gate 120 will change to a logic "0". One input to AND gate 144 will be a logic "0"; and, therefore, the output of AND gate 144 changes to a logic "O", inhibiting further operation of bistable multivibrator 94. Thus, the scanner 104 is stopped at the input which indicates a deviation from normal condition, input 146. In addition to temporarily inhibiting further counts from the bistable multivibrator, the output of buffer gate 120 is connected to an inverting gate 148, the output of which starts delay gate 150 which provides a retard, for example, 60 milliseconds, before enabling its output. The purpose of the retard or delay is to prevent operation of flipflop 142 in the event of momentary false signals. Such false signals may be caused by electrical noise or relay contact bounce. At the expiration of the 60 millisecond delay time, flipflop 142 is set by the output of delay gate 150, and the Q output goes to logic "0". The Q output of flipflop 142 maintains an inhibiting logic "0" output to multivibrator 94 through AND gate 144, so that even if the condition being monitored should return to normal, scanning remains inhibited and a warning message will be printed. The Q output of flipflop 142 is also applied to signal acknowledge bus 116. The signal acknowledge is applied to inverting gate 152 through demultiplexer 110. The output of gate 152 clocks flipflop 136, the Q output of flipflop 136 going to logic "1", since the input from switch 90 is at logic "1". As a result, the output of EXCLUSIVE OR gate 140 goes to logic "0" and the output of buffer gate 120 returns to logic "1".

The Q output of flipflop 136 will affect the operation of mechanical printer 154. In order to alert the operator of a deviation from normal condition, a programmed message is printed by printer 154. The message will be printed in red to alert the operator that the condition has deviated from normal. A print red command placed on line 156 effects printing in red. The print red data selector 108, like the print data selector 106 has stopped and has selected an input 158 which corresponds to input 146 of the print data selector. Thus, the Q output of flip flop 136 is connected through selector 108 to buffer gate 160. The output of buffer gate 160 is connected to print red bus 170, which is one input of NOR gate 172. When the Q output of flipflop 136 goes to logic "1", as a result of the signal acknowledge signal on bus 116, the output of buffer gate 160 goes to a logic "0". Thus, both inputs to NOR gate 172 are at logic "0" and its output goes to logic "1". The output of NOR gate 172 is the print red command, line 156, and whenever the output of NOR gate 172 is at logic "1", the mechanical printer 154 will print in red rather than black. In this manner, the first signal corresponding to a condition deviating from normal results in a message printed in red, and, as is described below, a subsequent return to normal will be printed in black.

The printing operation is initiated when the Q output of flipflop 142 goes to logic "0", this being a print command on line 174. The print red command appears an extremely short time after the print command and before actual printing has occurred. When the printing operation has been completed, flipflop 142 is reset by an end of print signal on line 176. This causes the Q output of flipflop 142 to return to the logic "1" state. Since the output of buffer gate 120 is already at logic "1", the output of AND gate 144 changes to logic "1" and bistable multivibrator 94 begins operation and other inputs are scanned.

There are no further messages relating to the deviation from normal condition that has been reported in red until the condition is restored to normal. At that time, the input from switch 90 returns to logic "0" and the output of EXCLUSIVE OR gate 140 goes to logic "1". The sequence of events which follows is substantially the same as when the condition originally deviated from normal since both the original deviation from normal, as well as the subsequent return to normal both cause the output of EXCLUSIVE OR gate 140 to be logic "1". While the sequence of events is identical to the sequence which occurs when switch 90 is first opened, the message which indicates a return to normal is printed in black because the Q output of flipflop 136 will be logic "0" after it is clocked by a signal derived from the signal acknowledge signal on bus 116. After the mechanical printer 154 prints the message in black, the end of print signal causes flipflop 142 to reset and enables bistable multivibrator 94 through AND gate 144 and scanning continues.

Printer 154 may be any type compatible with the control circuit, and in the preferrd embodiment is a Keltron Corporation type Dm-400 Digiprinter. The input to the printer can be programmed so that printer 154 prints specific alphabetic and numeric characters in desired positions in a line. For example, by providing the appropriate input signals, the printer can print FIRE 7253 in either red or black characters. The inputs to the printer are received from programmer circuit 178. FIG. 3 shows one section of the programmer circuit corresponding to the scanner circuit 104 shown in FIG. 3. In a larger system there will be as many more programmer sections as there are scanner sections, and the outputs of the programmer circuits will be tied together in parallel. The programmer circuit includes programmable read-only memory 180*a*, 180*b*, 180*c*, 180*d*, for example, Signetics Corporation Type 8Z23; comparators 182*a*, 182*b*, 182*c*, 182*d*, 182*e*, 182*f*, 182*g*, 182*h*; and inverting gates 184*a*, 184*b*, 184*c*, 184*d*, 184 *e*, 184*f*, 184*g*, 184*h*. In the preferred embodiment, the comparators are four bit comparators. The circuit is arranged to print an eight character message, foru alphabetic characters followed by four numerals.

In operation, the output of each programmable readonly memory is determined by the binary count bus 98 and the demultiplexer 102 output. Thus, the program circuit 178 of FIG. 3 represents one of sixteen possible program circuits and is the one which corresponds to scanner circuit 104. The output of binary counter 96 and the signal from demultiplexer 102 uniquely define which actuating device is being monitored, and the outputs of memories 180*a*, 180*b*, 180*c*, 180*d* will define the message corresponding to that device. If the condition being monitored is in the normal range, the Q output of flipflop 142 is at logic "0"and a message is not printed. When a deviation from normal occurs, the Q output of flipflop 142 goes to a logic "1", and the print command is given.

The eight bit output of each read-only memory represents two 4 bit words, each four bit word representing a numeric or an alphabetic character. The alphabetic or numeric characters have been pre-programmed into the read-only memories at some earlier time and determine the unique message corresponding to the condition being monitored. During printing, each four bit word is compared by the comparators with the output of the print drum on lines 186. When the print drum position agrees with a four bit work output of one or more of the read-only memories, the corresponding comparators enable their output lines which, through the corresponding inverting gates, cause the corresponding print solenoids to operate and print desired characters of the message. After the print drum has made a complete revolution so that all of the alphanumeric characters on the drum can be selected, the message is completed and an end of print signal is given over line 176. As noted above, the end of print signal resets flipflop 142, and allows the system to continue scanning.

It may be desirable not to print a character in one or more positions of the message. In that instance, circuitry exists in printer 154 to recognize a binary "1111" from the memory and to thereby inhibit printing in that position even if the comparator output is enabled.

Figure 4A:
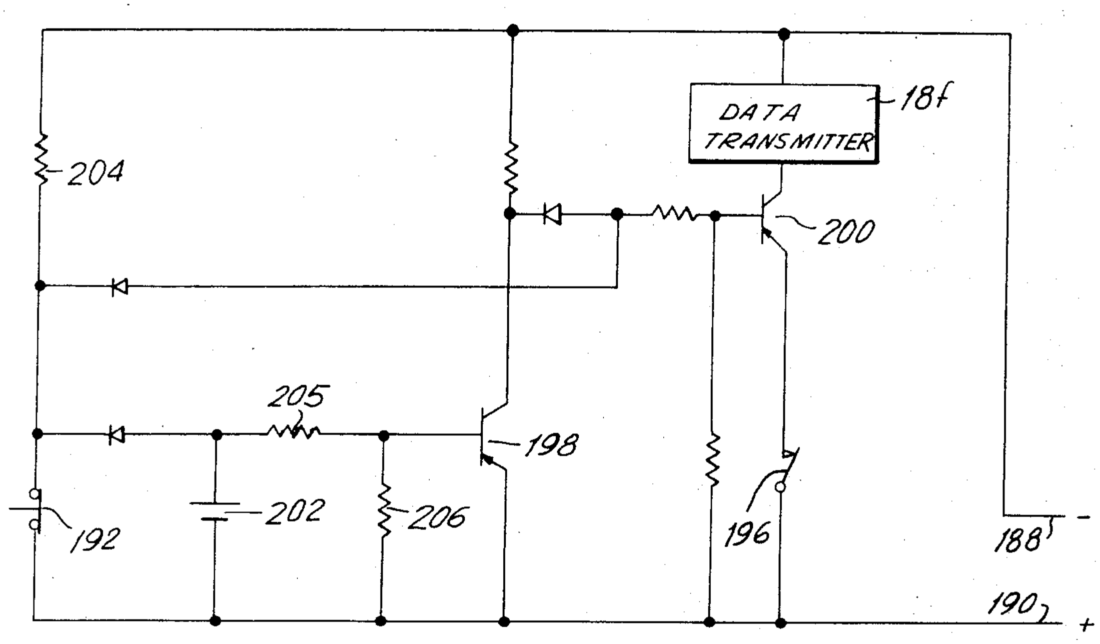
FIG. 4A is a circuit diagram of the transmitter time discriminator circuit of the system shown in FIG. 1.

FIG. 4A shows the transmitter time discriminator unit 40 of FIG. 1 in greater detail. Transmitter unit 40 and data transmitter 18*f*, rather than being distinct units, are integrally related. Connection to the transmission path, from which power is received is made at terminals 188 and 190. Referring to FIG. 4A momentary actuating device 192 may be a pushbutton switch or any other momentary switch such as found at watch report station 42. In normal operation, the actuating device 192 presents a closed circuit. Extended time actuating device 196 may be any normally closed switch which, when opened, remains open for an extended period of time, for example, longer than 3 seconds. This may correspond to a switch at fire alarm box 44.

The transmitter time discriminator unit is particularly useful when a watch report station and a fire alarm box are integral to the same unit. In operation, transistor 198 is normally in a non-conducting or off state, and transistor 200 is normally conducting or on. Data transmitter 18*f* is normally on. When momentary actuating device 192 opens, capacitor 202 charges through resistor 204 and, after a predetermined time, the base-emitter junction of transistor 198 becomes forward biased sufficiently to cause transistor 198 to turn on. Thus, shortly after momentary device 192 is opened, both transistors 198 and 200 are turned on. When momentary device 192 closes, transistor 198 remains on for an amount of time determined by the discharge of capacitor 202 through resistors 205, 206 and the base of transistor 198. Transistor 200 will turn off when device 192 closes until transistor 198 turns off. When transistor 200 turns off, the data transistor 18f will also turn off. After the predetermined amount of time, the circuit returns to its normal condition with capacitor 202 substantially discharged. Thus after momentary device 192 is actuated and released, data transmitter 18*f* turns off for a predetermined short amount of time. When extended time device 196 is opened, data transmitter 18*f* turns off immediately and remains off for as long as device 196 is open, a time longer than the above mentioned "predetermined short amount of time."

Figure 4B:
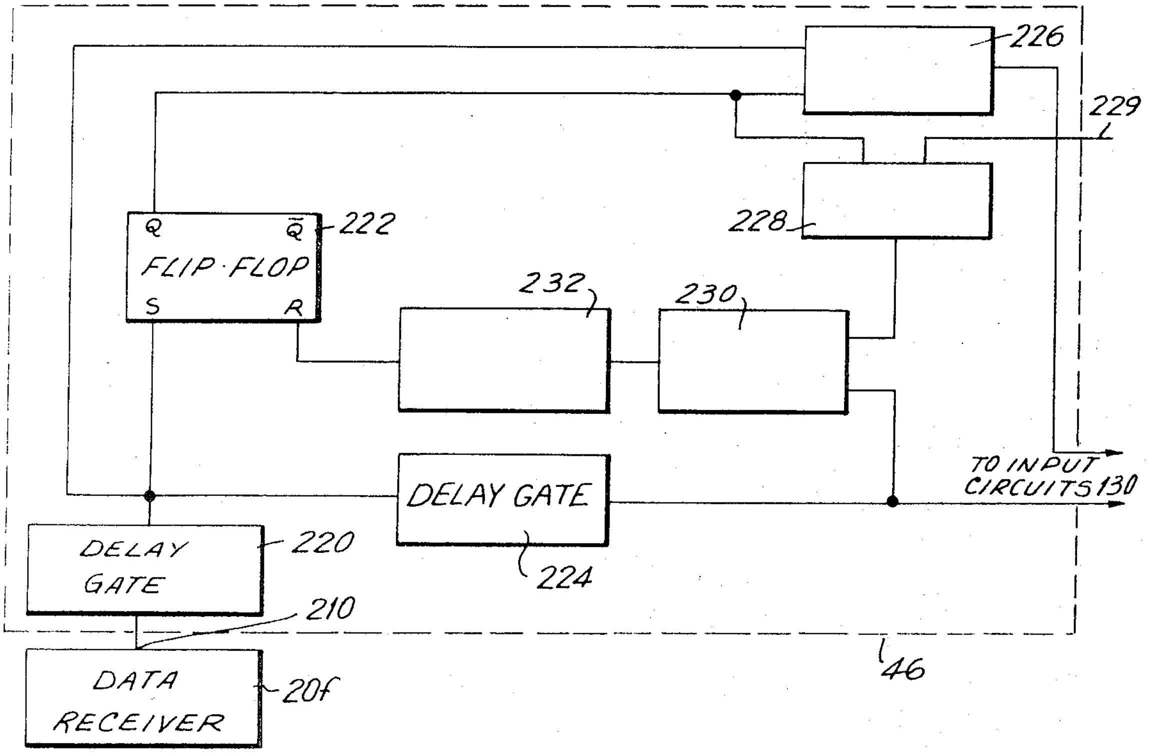
FIG. 4B is a detailed block diagram of the receiver time discriminator circuit of the system shown in FIG. 1.

FIG. 4B shows the receiver time discriminator circuit 46 and data receiver 20*f* in more detail. When data transmitter 18*f* turns off, the associated data receiver 20*f* also turns off and output 210 of data receiver 20f, normally at logic "0", thereby starts a delay gate 220, for example a 60 millisecond delay. This delay prevents electrical noise or sporadic contact closure from triggering the circuit. At the end of 60 milliseconds, the output of delay gate 220, normally logic "0", is enabled to a logic level "1". This sets a flipflop 222 and starts a second delay gate 224. Flipflop 222 is preferably of the R-S type. Delay gate 224 may be of any relatively long delay time, and is preferably 3 seconds, corresponding to the minimum open time of actuating device 196. The Q output of flipflop 222 goes to logic "0". If the momentary device 192 had opened, transmitter 18*f* will turn off, for example, for 500 milliseconds, and data receiver 20*f* turns back on after 500 milliseconds causing delay gate 220 to inhibit the output of delay gate 224 before it is enabled to logic "1". The inputs to a NOR gate 226 are both now at logic "0", so that gate 226 provides a logic "1" as an input to a circuit 130. When printer 154 responds with the end of print signal over line 176, the inverse of that signal is applied to a NOR gate 228 over line 229. The output of NOR gate 228 changes to logic "1". A NOR gate 230 thereby provides a logic "0" signal to an inverter 232, the output of delay gate 224 being at logic "0", and flipflop 222 is reset with the Q output returning to logic "1".

If the extended time actuating device 196 had opened, data receiver 20*f* turns off and delay gate 220 is started as before. At the expiration of 60 milliseconds, delay gate 224 is started and flipflop 222 is set again as before. After 3 seconds, the delay gate 224 provides a logic "1" to one of the plurality of input circuits 130 described in conjunction with FIG. 3 and also provides a logic "1" to NOR gate 230 to reset flipflop 222, through inverter 232. When the data receiver turns on following the reclosing of device 196, gates 224 and 220 turn off so that the signal to the input circuits 130 turns off.

It should be appreciated that the time discriminator units of FIGS. 4A and 4B are not capable of indicating simultaneous operation of both actuating devices. Thus, priority is given to the extended time device, so that if it is actuated the momentary closure of device 192 will be lost. As a practical matter, this is of little importance since, as previously explained, the extended time device is usually used for fire alarms, and the circumstances requiring its usage would preempt the routine watch report signal. Further, the transmission of a fire alarm signal would have the same effect as a watch signal, i.e., an indication that the watchman is present on the scene.

The momentary closure of device 192 may be lost in another instance. If, after flipflop 222 is set and data receiver 20f turns on, an end of print signal acknowledging a different input occurs, then flipflop 222 will be reset and no record of the momentary signal will remain. In order to prevent this loss of data, the end of print signal can be gated by circuitry which allows only the end of print signal corresponding to the momentary device input to reset flipflop 222 through gate 228.

Other embodiments will occur to those skilled in the art and are within the following claims.

What is claimed is:

1. An electrical signaling system comprising a plurality of monitor stations for transmitting signals in response to the status of a selected condition, a supervisory central station, at least one transmission path interconnecting said monitor stations and said supervisory central station, said supervisory central station including a plurality of receiving devices connected to said transmission path for receiving the signals transmitted by said monitor stations, said receiving device having an output to indicate the status of the selected condition and at least one input circuit associated with each receiving device and connected to the output of the receiving device, said input circuit having a clocked flipflop connected to said output to store the status of the selected condition, and an EXCLUSIVE OR gate having as inputs, the flipflop and the output of the receiving device, the EXCLUSIVE OR gate having an output signal connected to a scanning circuit to indicate a change in the status of the selected condition.

2. The electrical signaling system of claim 1 in which said scanning circuit includes at least one selector circuit having inputs to receive the output signal from the EXCLUSIVE OR gate, and at least one demultiplexer circuit to feed back a delayed version of the output signal to clock the flipflop.

3. The electrical signaling system of claim 2 including means for sequentially scanning the inputs of the selector circuit and means for inhibiting sequential scanning when the output signal indicates a change in the status of the condition.

4. The electrical signaling system of claim 3 including a printer and a programmer circuit for causing the printer to print a message corresponding to the condition at which the sequential scanner was inhibited.

5. A multiplex electrical signaling system comprising a plurality of monitor stations, a supervisory central station, at least one transmission path including two conducting paths interconnecting said monitor stations and said supervisory central station, each conducting path having first and second ends, each conducting path looping out from the supervisory central station and returning back to the central station, said central supervisory station including a current sensitive relay coil connected to one end of each of said pair of conductive paths, the other ends of said conductive paths being connected to a source of power, said relay coil having associated with it contacts, the contacts being arranged to supply power to both ends of the conductive path at the supervisory central station when the coil is deenergized.

6. The multiplex electrical signaling system of claim 5 including a circuit means to disconnect said relay from the power source when the coil is deenergized and a switch to momentarily supply energizing current to the relay coil whereby the relay coil will be reset.

7. The multiplex electrical signaling system of claim 6 further including short circuit control means connected across the transmission path to detect a decrease in the impedance between the two conductors, said means including a transistor having an emitter, base, and collector, the collector being connected to one side of the source of power through a current sensitive device, the emitter being connected to a second side of the source of power through a predetermined voltage drop, and a resistor between the emitter and base, the base being connected to the transmission path whereby a voltage is produced between the base and emitter in proportion to the current between the two conductors.

8. The multiplex electrical signaling system of claim 7 wherein the current sensitive device is a relay.

9. The multiplex electrical signaling system of claim 6 wherein the source of power is isolated from earth ground, and further including an earth ground control for indicating when there is a short between earth ground and the transmission path, said earth ground control including a relay coil having one terminal connected to earth ground and the other terminal connected through impedances to both sides of the source of power.

10. An electrical signaling system comprising a plurality of monitor stations, a central supervisory station, at least one transmission path including two conducting paths interconnecting said monitor stations and said central supervisory station, said monitor stations including a transmitter time discriminator for providing an indicating signal of short time duration when a momentary actuating device is operated, and an indicating signal of long duration when an extended time actuating device is operated.

11. The electrical signaling system of claim 10 wherein said monitor station includes a single tone transmitter, said transmitter being turned off when the extended time actuating device is operated, and being turned off for a predetermined short time after actuation of the momentary actuating device.

12. The electrical signaling system of claim 11 wherein the transmitter time discriminator includes a first transistor, the transmitter being connected to a collector of the first transistor and the extended time actuating device being connected to an emitter of the first transistor, the first transistor being normally turned on when the extended time actuating device and the momentary actuating device are closed.

a second transistor, first circuit means to connect a collector of the second transistor to the base of the first transistor, the momentary actuating device being in a base circuit of the second transistor, a timing capacitor resistively connected to the base of the second transistor, the momentary contact being connected across the capacitor in the base circuit of the second transistor so that the capacitor charges to turn on the second transistor, when the momentary switch is opened, whereby the capacitor discharges partially through the second transistor when the momentary actuating device is closed and the first transistor is held for a short time while the second transistor is on and the momentary actuating device is closed.

13. The electrical signaling system of claim 12 including a receiver time discriminator for distinguishing two signals from the transmitter time discriminator and for producing two signals which indicate the status of the devices at the monitor station.

14. The electrical signaling system of claim 13 wherein said receiver time discriminator includes a delay device having a delay time corresponding to the minimum time actuation of the extended time contact, said delay device being connected to receive a delayed version of the signal output of the data receiver.

* * * * *

UNITED STATES PATENT OFFICE
CERTIFICATE OF CORRECTION

Patent No. 3,821,479 Dated June 28, 1974

Inventor(s) Donald W. Campbell

It is certified that error appears in the above-identified patent and that said Letters Patent are hereby corrected as shown below:

In the title, insert "SYSTEM" after "SIGNALING".

As the inventor, the name "David" should be "Donald".

In the abstract, line 15, the word "dircuit" should be "circuit".

In the abstract, line 16, the word "cofresponing" should be "corresponding".

Column 6, line 34, the word "is" should be "in".

Column 8, line 65, the word "has" should be "had".

Column 9, line 19, the word "Dm-400" should be "DM-400".

Column 9, line 38, the word "foru" should be "four".

Signed and sealed this 26th day of November 1974.

(SEAL)
Attest:

McCOY M. GIBSON JR.
Attesting Officer

C. MARSHALL DANN
Commissioner of Patents

FORM PO-1050 (10-69)
USCOMM-DC 60376-P69
U.S. GOVERNMENT PRINTING OFFICE : 1969 O—366-334